(12) United States Patent
Nandy et al.

(10) Patent No.: US 12,273,219 B2
(45) Date of Patent: Apr. 8, 2025

(54) EFFICIENT MULTICAST PACKET FORWARDING IN A DISTRIBUTED TUNNEL FABRIC

(71) Applicant: Hewlett Packard Enterprise Development LP, Spring, TX (US)

(72) Inventors: Tathagata Nandy, Bangalore (IN); Chethan Chavadibagilu Radhakrishnabhat, Bangalore (IN); Thomas Samuel, Bangalore (IN); Priyam De, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 314 days.

(21) Appl. No.: 18/072,019

(22) Filed: Nov. 30, 2022

(65) Prior Publication Data

US 2024/0179025 A1 May 30, 2024

(51) Int. Cl.
*H04L 12/46* (2006.01)
*H04L 45/02* (2022.01)
*H04L 45/16* (2022.01)

(52) U.S. Cl.
CPC .......... *H04L 12/4633* (2013.01); *H04L 45/04* (2013.01); *H04L 45/16* (2013.01)

(58) Field of Classification Search
None
See application file for complete search history.

(56) References Cited

U.S. PATENT DOCUMENTS 11,206,208 B2 * 12/2021 Malhotra ............ H04L 67/1097

OTHER PUBLICATIONS

Behringer et al., "Using Only Link-Local Addressing inside an IPV6 Network", Request for Comments: 7404, Nov. 2014, 10 pages.
Christensen et al., "Considerations for Internet Group Management Protocol (IGMP) and Multicast Listener Discovery (MLD) Snooping Switches", Request for Comments: 4541, May 2006, 16 pages.
Storvisor et al., "Virtual extensible Local Area Network (VXLAN): A Framework for Overlaying Virtualized Layer 2 Networks over Layer 3 Networks", Request for Comments: 7348, Aug. 2014, 22 pages.

* cited by examiner

*Primary Examiner* — Christine T Duong
(74) *Attorney, Agent, or Firm* — Yao Legal Services, Inc.

(57) ABSTRACT

A system for efficient multicast control packet forwarding is provided. During operation, the system can maintain a first tunnel between a first switch and a second switch in an overlay tunnel fabric. The encapsulation of a packet sent via the overlay tunnel fabric is initiated and terminated within the overlay tunnel fabric. The system can maintain a second tunnel between the first switch and a third switch, which can be in an external network that excludes the first and second switches. The switch can distinguish the first and second tunnels as intra-fabric and inter-fabric tunnels, respectively. Upon receiving a multicast control packet via the first tunnel, the system can identify the second tunnel as the inter-fabric tunnel and forward the multicast control packet via the second tunnel. Here, a respective multicast control packet received from the first tunnel can be precluded from being forwarded on intra-fabric tunnels.

20 Claims, 10 Drawing Sheets

EFFICIENT MULTICAST PACKET FORWARDING IN A DISTRIBUTED TUNNEL FABRIC

BACKGROUND

Field

The present disclosure relates to communication networks. More specifically, the present disclosure relates to a method and system for efficiently forwarding multicast control packets in a distributed tunnel fabric, which can be in a multi-fabric network.

BRIEF DESCRIPTION OF THE FIGURES

In the figures, like reference numerals refer to the same figure elements.

DETAILED DESCRIPTION

The following description is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the aspects shown, but is to be accorded the widest scope consistent with the claims.

The Internet is the delivery medium for a variety of applications running on physical and virtual devices. Such applications have brought with them an increasing traffic demand. As a result, equipment vendors race to build switches with versatile capabilities. To do so, a switch may support different protocols and services. For example, the switch can support tunneling and virtual private networks (VPNs). The switch can then facilitate overlay routing for a VPN over the tunnels. For example, an Ethernet VPN (EVPN) can be deployed as an overlay over a set of virtual extensible local area networks (VXLANs). To deploy a VPN over the tunnels, a respective tunnel endpoint may map a respective client virtual local area network (VLAN) to a corresponding tunnel network identifier (TNI), which can identify a virtual network for a tunnel.

The TNI may appear in a tunnel header that encapsulates a packet and is used for forwarding the encapsulated packet via a tunnel. For example, if the tunnel is formed based on VXLAN, the TNI can be a virtual network identifier (VNI) of a VXLAN header, and a tunnel endpoint can be a VXLAN tunnel endpoint (VTEP). A TNI can also be mapped to the virtual routing and forwarding (VRF) associated with the tunnels if layer-3 routing and forwarding are needed. Since a VPN can be distributed across the tunnel fabric, a VPN over the tunnel fabric can also be referred to as a distributed tunnel fabric. A gateway of the fabric can be a virtual gateway switch (VGS) shared among a plurality of participating switches. To avoid loops in the fabric, a split-horizon rule can prevent multicast packets received from one tunnel from being forwarded to another. As a result, distributing control packets in a multi-fabric environment, where multiple fabrics are coupled to each other via inter-fabric tunnels, can be challenging.

The aspects described herein solve the problem of efficiently forwarding multicast control packets in a distributed tunnel fabric by (i) determining whether to forward a multicast control packet via a tunnel based on the ingress and egress information of the packet; and (ii) deploying a multicast querier at a respective tunnel endpoint, thereby localizing the operations of the querier. If the fabric is in a multi-fabric network, the forwarding decision can allow a gateway of the fabric to forward the control packet from a host to a source even if they are separated by multiple fabrics. Furthermore, a querier (e.g., an Internet Group Management Protocol (IGMP)/Multicast Listener Discovery (MLD) querier) at an endpoint can process local multicast control packets, thereby avoiding latency and bandwidth utilization associated with a remote querier.

The gateway switch, which can include a VGS, can couple the fabric to other networks. Typically, at least two switches can operate as a single switch in conjunction with each other to facilitate the VGS. Switches participating in the VGS can be referred to as participating switches. A respective participating switch can consider the other participating switches as peer participating switches (or peer switches). A respective pair of participating switches can be coupled to each other via an inter-switch link (ISL). The VGS can be associated with one or more virtual addresses (e.g., a virtual Internet Protocol (IP) address and/or a virtual media access control (MAC) address). A respective tunnel formed at the VGS can use the virtual address to form the tunnel endpoint. As a result, other tunnel endpoints of the fabric can consider the VGS as the other tunnel endpoint for a tunnel instead of any of the participating switches.

To forward traffic toward the VGS, a tunnel endpoint of the fabric can perform a load balancing operation (e.g., based on hashing on a respective packet) and select one of the participating switches as the destination (i.e., as the other tunnel endpoint). The tunnel endpoint can then forward the packet via a tunnel between the tunnel endpoints. Hence, an endpoint may forward a multicast control packet to one of the participating switches, which in turn, can share the control packet with a peer participating switch via the ISL. If the fabric is a multi-fabric network, the fabric can be one of a plurality of fabrics forming the network. A respective fabric can then include a gateway switch, which can include a VGS, that can be coupled to a remote gateway switch of another fabric, an external network, or both. For example, the gateway switch can be coupled to the remote gateway switch via an inter-fabric tunnel (i.e., a tunnel coupling two fabrics).

A packet received at the gateway switch via an intra-fabric tunnel (i.e., a tunnel within a fabric) can be encapsulated with a tunnel header associated with the intra-fabric tunnel. The gateway switch can decapsulate the tunnel header and re-encapsulate the packet with another tunnel header associated with the inter-fabric tunnel. With existing technologies, a respective tunnel endpoint switch (or an endpoint) in a fabric can deploy a split-horizon rule for preventing packet flooding and looping in the fabric. The split-horizon rule can prevent the endpoint from forwarding a multi-destination packet, such as a multicast control packet, to another tunnel endpoint. In other words, if the packet is received from one tunnel, the split-horizon rule can preclude the endpoint from forwarding the packet via another tunnel.

However, in a multi-fabric network, fabrics can be interconnected using inter-fabric tunnels. Because of the split-horizon rule, upon receiving a multicast control packet from a tunnel, the gateway switch may not forward the packet to another fabric via a corresponding tunnel. Consequently, if a host and a source are separated by multiple fabrics, a join request from the host may not be forwarded to the source. Furthermore, to conform to the standard deployment practice, the multi-fabric network may deploy a single multicast querier. The querier can be responsible for issuing multicast control packets, such as an all-host query (AHQ) and a group membership query (GSQ), for determining the status of group members. Since different fabrics can be geographically dispersed, deploying a single querier can cause flooding in the network with the control packets and a long response time from the hosts.

To solve this problem, the gateway switch of the fabric may determine whether to forward a multicast control packet via a tunnel by selectively deploying the split-horizon rule. The gateway switch can maintain a set of forwarding rules that indicate whether a multicast control packet is allowed to be forwarded for an ingress-egress combination. For example, if a multicast control packet is received from an inter-fabric tunnel, the gateway switch can forward the control packet via an intra-fabric tunnel by suppressing the split-horizon rule for the control packet based on the forwarding rules. Similarly, if the control packet is received from an intra-fabric tunnel, the gateway switch can forward the control packet via an inter-fabric tunnel based on the forwarding rules. This ensures the propagation of control packets between fabrics.

During operation, an endpoint in a fabric can receive a multicast control packet, such as a packet with a join or leave message. The endpoint can then forward the control packet to a respective other tunnel endpoint of the fabric via corresponding intra-fabric tunnels of the fabric. The gateway switch can then determine that the ingress for the control packet is an intra-fabric tunnel and determine that the control packet is allowed to egress via an inter-fabric tunnel to another fabric based on the forwarding rules. The gateway switch can then forward the control packet via a respective inter-fabric tunnel. A remote gateway switch, which can be the other endpoint of the inter-fabric tunnel, of another fabric can receive the control packet and determine that the control packet is allowed to egress via an intra-fabric tunnel based on the forwarding rules. The remote gateway switch can then forward the control packet via the intra-fabric tunnels of the fabric.

In addition, if the gateway switch is coupled to an external network, such as a wireless network, the gateway switch may maintain a static tunnel with the external network. In particular, the external network may maintain a cluster of gateway devices that can couple the external network to the fabric. The gateway switch can then maintain a static tunnel with a respective gateway device. The gateway switch can apply similar rules, which can be applicable to the inter-fabric tunnels, for the static tunnels. For example, a control packet received from a dynamic tunnel (e.g., an intra-fabric tunnel) can be allowed to be forwarded to a static tunnel. Moreover, a control packet received from a static tunnel can be allowed to be forwarded to a dynamic tunnel (i.e., can be distributed within the fabric).

The fabric can be further enhanced by configuring a respective endpoint as a querier for the local layer-2 ports, thereby facilitating distributed queriers in the fabric. Here, each endpoint can operate as a local querier for the locally coupled client devices (e.g., local hosts). To ensure the localization of the queriers, the endpoint can be precluded from configuring a tunnel port as a querier port for guiding multicast data paths in the fabric. As a result, when the endpoint receives a leave message for a multicast group from a local host, the endpoint can distribute a multicast control packet (e.g., a GSQ) in the fabric to determine the existence of other members of the multicast group. On the other hand, upon recovery from an event, the endpoint can send another multicast packet (e.g., an AHQ) via the local ports to re-learn the multicast information. In this way, the distributed queries can facilitate quick convergence without impacting the forwarding of multicast data paths in the fabric.

In this disclosure, the term "switch" is used in a generic sense, and it can refer to any standalone or fabric switch operating in any network layer. "Switch" should not be interpreted as limiting examples of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "message" refers to a group of bits that can be transported together across a network. "Message" should not be interpreted as limiting examples of the present invention to a particular layer of a network protocol stack. "Message" can be replaced by other terminologies referring to a group of bits, such as "packet," "frame," "cell," "datagram," or "transaction." Furthermore, the term "port" can refer to the port that can receive or transmit data. "Port" can also refer to the hardware, software, and/or firmware logic that can facilitate the operations of that port.

Figure 1A:
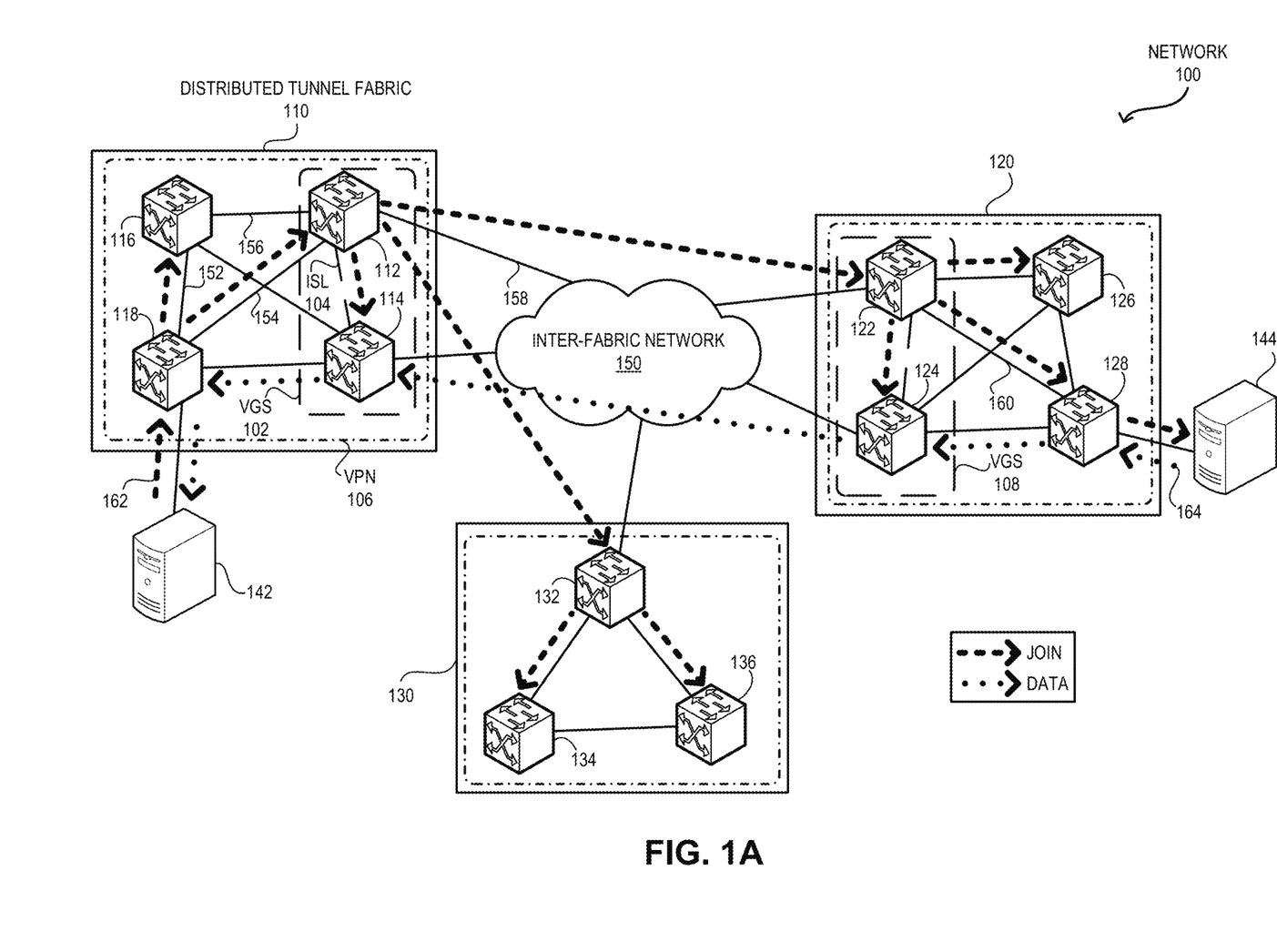
FIG. 1A illustrates an example of multicast control packet forwarding in a multi-fabric network, in accordance with an aspect of the present application.

FIG. 1A illustrates an example of multicast control packet forwarding in a multi-fabric network, in accordance with an aspect of the present application. A network 100 can include a number of switches and devices, and may include heterogeneous network components, such as layer-2 and layer-3 hops, and tunnels. In some examples, network 100 can be an Ethernet, InfiniBand, or other network, and may use a corresponding communication protocol, such as Internet Protocol (IP), FibreChannel over Ethernet (FCOE), or other protocol. Network 100 can include a plurality of distributed tunnel fabrics 110, 120, and 130. Hence, network 100 can be a multi-fabric network. Fabric 110 can include switches 112, 114, 116, and 118; fabric 120 can include switches 122, 124, 126, and 128; and fabric 130 can include switches 132, 134, and 136. A respective switch in a respective fabric can be associated with a MAC address and an IP address. In a respective fabric of network 100, switches can be coupled to each other via a tunnel.

In FIG. 1, a respective link denoted with a solid line between a switch pair can indicate a tunnel. Switches of a respective fabric in network 100 may form a mesh of tunnels. Examples of a tunnel can include, but are not limited to, VXLAN, Generic Routing Encapsulation (GRE), Network Virtualization using GRE (NVGRE), Generic Networking Virtualization Encapsulation (Geneve), Internet Protocol Security (IPsec), and Multiprotocol Label Switching (MPLS). The tunnels in a fabric can be formed over an underlying network (or an underlay network). The underlying network can be a physical network, and a respective link of the underlying network can be a physical link. A respective switch pair in the underlying network can be a Border Gateway Protocol (BGP) peer. A VPN 106, such as an Ethernet VPN (EVPN), can be deployed over fabric 110. Similarly, respective instances of a VPN, which can be VPN 106, can be deployed over fabrics 120 and 130. Fabric 110 can include a VGS 102 that can be coupled to a VGS 108 of fabric 120 via an inter-fabric network 150. Here, inter-fabric network 150 can be a wide-area network (WAN), such as an enterprise network or the Internet. VGS 102 and 108 can be coupled to gateway switch 132 of fabric 130 via network 150.

In fabric 110, switches 112 and 114 can operate as a single switch in conjunction with each other to facilitate VGS 102. VGS 102 can be associated with one or more virtual addresses (e.g., a virtual IP address and/or a virtual MAC address). A respective tunnel formed at VGS 102 can use the virtual address to form the tunnel endpoint. To efficiently manage data forwarding, switches 112 and 114 can maintain an ISL 104 between them for sharing control and/or data packets. ISL 104 can be a layer-2 or layer-3 connection that allows data forwarding between switches 112 and 114. ISL 104 can also be based on a tunnel between switches 112 and 114 (e.g., a VXLAN tunnel).

Because the virtual address of VGS 102 is associated with both switches 112 and 114, other tunnel endpoints, such as switches 116 and 118, of fabric 110 can consider VGS 102 as the other tunnel endpoint for a tunnel instead of switches 112 and 114. To forward traffic toward VGS 102 in fabric 110, a remote switch, such as switch 116 or 118, can operate as a tunnel endpoint while VGS 102 can be the other tunnel endpoint. From each of switches 112 and 114, there can be a set of paths (e.g., equal-cost multiple paths or ECMP) to VGS 102. A respective path in the underlying network can lead to one of the participating switches of VGS 102. Similarly, switches 122 and 124 can operate as a single switch in conjunction with each other to facilitate VGS 108 in fabric 120. A respective fabric in network 100 can be coupled to a plurality of end devices. For example, end devices 142 and 144 can be coupled to switches 118 and 128, respectively.

Suppose that end devices 142 and 144 are the host and source, respectively, for a multicast group. Hence, end devices 142 and 144 can also be referred to as host 142 and source 144, respectively. To receive multicast data from source 144, host 142 can send a multicast control packet 162, which can be a multicast join request (e.g., an IGMP/MLD join), to switch 118. To distribute packet 162 in fabric 110, switch 118 can encapsulate packet 162 in a tunnel header and forward encapsulated packet 162 to a respective other endpoint, such as switch 116 and VGS 102, via intra-fabric tunnels 152 and 154, respectively. A tunnel header can be generated based on the tunneling protocol for establishing and maintaining the corresponding tunnel. Since switches 112 and 114 can appear as a single endpoint to switch 118, one of the switches in VGS 102, such as switch 112, can receive encapsulated packet 162. Upon receiving encapsulated packet 162, switch 112 can decapsulate the tunnel header to obtain packet 162 and share packet 162 with peer participating switch 114 via ISL 104.

With existing technologies, a respective switch in fabric 110 can deploy the split-horizon rule that can prevent the switch from forwarding packet 162 via another tunnel. As a result, switch 116 may not forward packet 162 via tunnel 156 because packet 162 is received from tunnel 152. Since network 100 can be a multi-fabric network, fabrics 110, 120, and 130 can be coupled to each other using inter-fabric tunnels via network 150. Because of the split-horizon rule, upon receiving packet 162 from tunnel 154, switch 112 may not forward packet 162 to fabric 120 via corresponding inter-fabric tunnel 158. Since host 142 and source 144 are separated by multiple fabrics, packet 162 from host 142 may not be forwarded to source 144. Consequently, host 142 may not be able to join the multicast group.

To solve this problem, a respective gateway switch in network 100 may selectively deploy the split-horizon rule. Here, a gateway switch can be the participating switches of a VGS (e.g., switch 112 or 122) or a standalone gateway switch (e.g., switch 132). In fabric 110, switch 112 can identify the type of a respective tunnel for which VGS 102 is an endpoint. The type can indicate whether a tunnel is an inter-fabric tunnel or an intra-fabric tunnel. Switch 112 may discover the type of a tunnel based on whether the other tunnel endpoint is in fabric 110. If the routing information associated with the other tunnel endpoint is obtained from internal BGP (IBGP), switch 112 can identify the corresponding tunnel as an intra-fabric tunnel. On the other hand, if the routing information associated with the other tunnel endpoint is obtained from external BGP (eBGP), switch 112 can identify the corresponding tunnel as an inter-fabric tunnel. The type of a tunnel can also indicate whether the tunnel is static or dynamic. Switch 112 can identify whether a tunnel is static based on the configuration information of the tunnel.

Based on the type of an ingress tunnel, the gateway switch can determine whether to forward a control packet via an egress tunnel. For example, upon obtaining packet 162, switch 112 can determine that the ingress for packet 162 is an intra-fabric tunnel. Switch 112 can check against the forwarding rules and determine that packet 162 is allowed to egress via an inter-fabric tunnel to another fabric. Switch 112 can then identify a respective inter-fabric tunnel coupled to switch 112, encapsulate packet 162 with a corresponding tunnel header, and forward encapsulated packet 162 via the inter-fabric tunnel. Accordingly, switch 112 can forward encapsulated packet 162 via inter-fabric tunnel 158 by suppressing the split-horizon rule for packet 162 based on the forwarding rules. Similarly, switch 112 (or switch 114) can also forward encapsulated packet 162 to switch 132 via a corresponding inter-fabric tunnel via network 150. Here, switch 112 can forward packet 162 to endpoints of a remote fabric even if switch 112 is not configured as an IGMP querier or a Protocol Independent Multicast (PIM) router.

VGS 108 can be the other endpoint of inter-fabric tunnel 158. One of the participating switches of VGS 108, such as switch 122, can receive encapsulated packet 162 and decapsulate the tunnel header to obtain packet 162. Switch 122 can then share packet 162 with peer participating switch 124 via an ISL of VGS 108. Switch 122 can also determine that the ingress for packet 162 is inter-fabric tunnel 158, check against the forwarding rules, and determine that packet 162 is allowed to egress via an intra-fabric tunnel. Switch 122 can then identify a respective intra-fabric tunnel coupled to VGS 108, such as tunnel 160. Subsequently, switch 122 can encapsulate packet 162 with a corresponding tunnel header and forward encapsulated packet 162 via the intra-fabric tunnel. In the same way, upon receiving packet 162 via an inter-fabric tunnel, switch 132 can forward packet 162 via respective intra-fabric tunnels to switches to switches 134 and 136 based on the forwarding rules.

When switch 128 receives encapsulated packet 162 via tunnel 160, switch 128 can decapsulate the tunnel header and forward packet 162 via local ports. Source 144 can receive packet 162 and determine the join request for the multicast group. Source 144 can then initiate transmission of the data stream of the multicast group to host 142. Source 144 can send a multicast data packet 164 of the multicast group and send packet 164 to switch 128. Switch 128 can forward packet 164 based on a multicast tree associated with the multicast group in network 100. Packet 164 can then be forwarded via fabrics 120 and 110 to host 142. In this way, the forwarding rules ensure the propagation of control and data packets between hosts and sources even if they are separated by multiple fabrics in network 100.

Figure 1B:
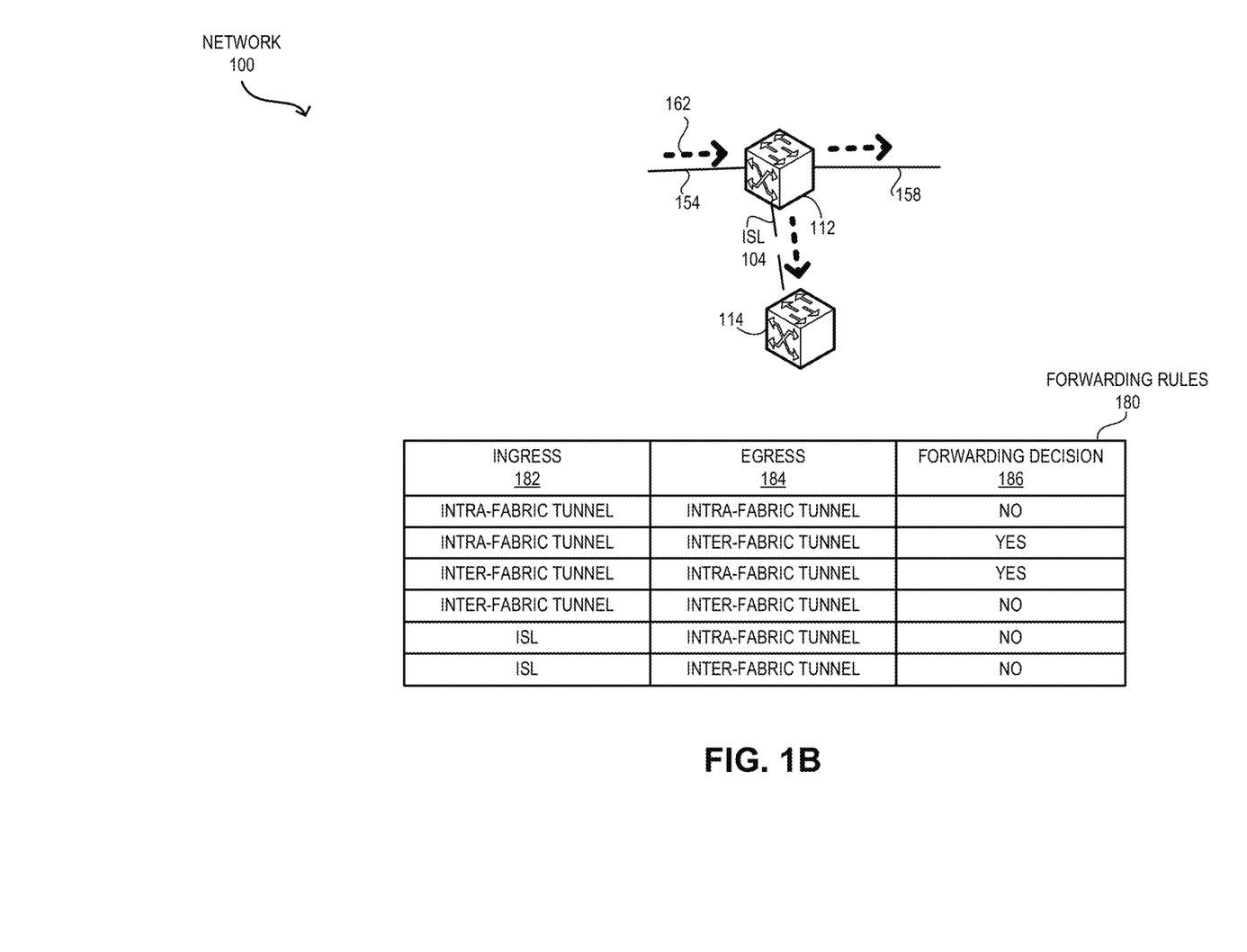
FIG. 1B illustrates an example of forwarding rules for forwarding multicast control packets in a multi-fabric network, in accordance with an aspect of the present application.

To determine whether to forward a packet, switch 112 can maintain a set of forwarding rules. FIG. 1B illustrates an example of forwarding rules for forwarding multicast control packets in a multi-fabric network, in accordance with an aspect of the present application. A respective gateway switch in network 100, such as switch 112, can maintain a set of forwarding rules 180. A respective forwarding rule can provide a forwarding decision 186 indicating whether a control packet received from an ingress 182 is allowed to be forwarded to an egress 184. In other words, a respective forwarding rule can include a forwarding decision 186 for a combination of ingress 182 and egress 184. Here, forwarding decision 186 can indicate whether the packet is allowed to be forwarded for the combination of ingress 182 and egress 184.

In forwarding rules 180, if ingress 182 is an intra-fabric tunnel and egress 184 is an inter-fabric tunnel, forwarding decision 186 can indicate that a packet is allowed to be forwarded (denoted with a "yes"). Similarly, if ingress 182 is an inter-fabric tunnel and egress 184 is an intra-fabric tunnel, forwarding decision 186 can also indicate that a packet is allowed to be forwarded. For all other combinations of ingress 182 and egress 184, forwarding decision 186 can indicate that a packet is not allowed to be forwarded (denoted with a "no"). Accordingly, switch 112 can forward packet 162 via inter-fabric tunnel 158 when packet 162 is received from intra-fabric tunnel 154. However, when switch 114 receives packet 162 via ISL 104, switch 114 does not forward packet 162 via another tunnel.

Figure 2A:
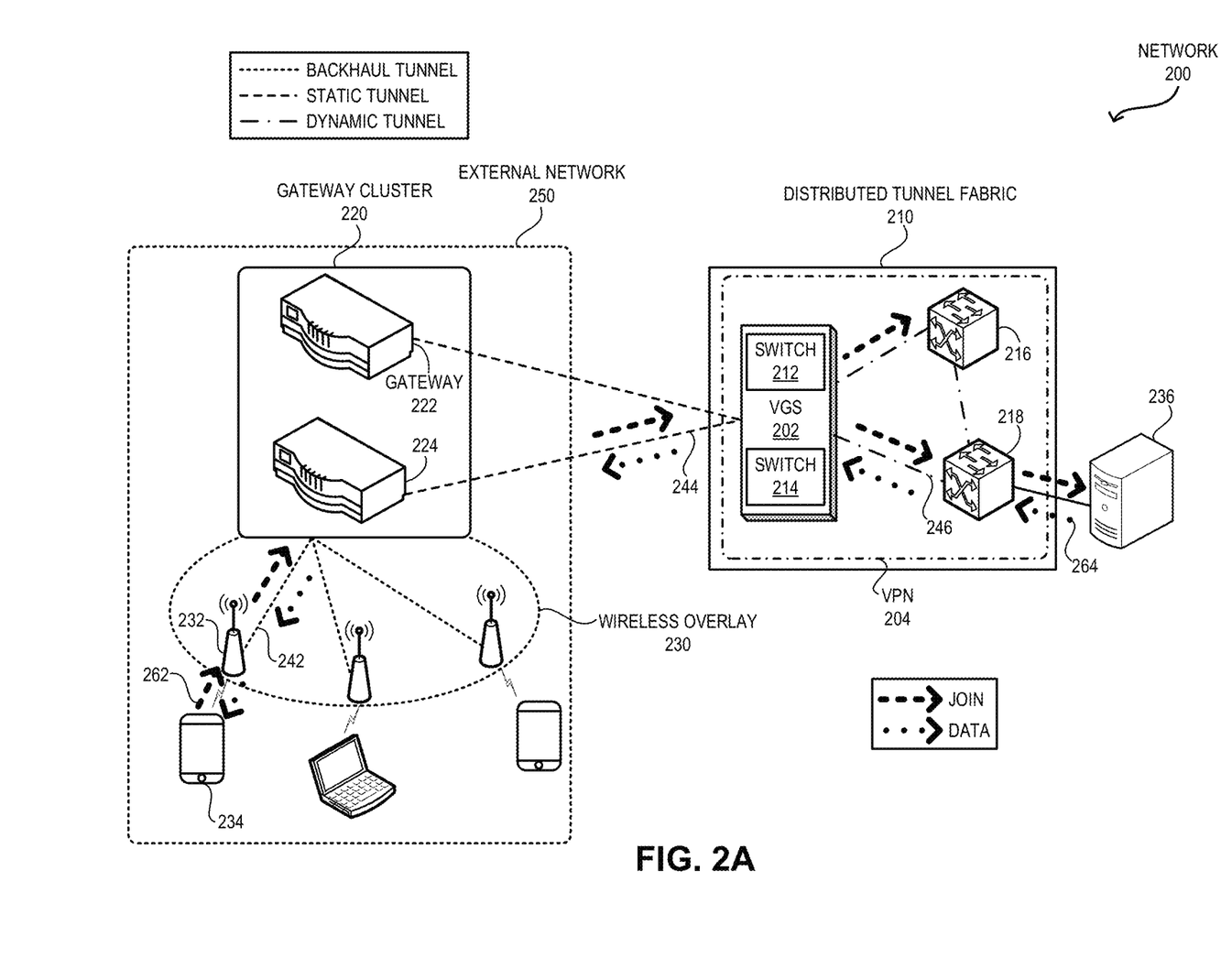
FIG. 2A illustrates an example of multicast control packet forwarding in a heterogeneous network, in accordance with an aspect of the present application.

FIG. 2A illustrates an example of multicast control packet forwarding in a heterogeneous network, in accordance with an aspect of the present application. A network 200 can include a number of switches and devices, and may include heterogeneous network components, such as layer-2 and layer-3 hops, and tunnels. In some examples, network 200 can be an Ethernet, InfiniBand, or other network, and may use a corresponding communication protocol, such as IP, FCOE, or other protocol. Network 200 can include a distributed tunnel fabric 210 and an external network 250. Hence, network 200 can be heterogeneous. Fabric 210 can include several switches 212, 214, 216, and 218. In fabric 210, switches 212 and 214 can operate as a single switch in conjunction with each other to facilitate a VGS 202. A respective switch in fabric 210 can be associated with a MAC address and an IP address. A VPN 204, such as an EVPN, can be deployed over fabric 210. An end device 236 can be coupled to switch 216.

A respective tunnel, such as tunnel 246, between a switch pair in fabric 210 can be established based on dynamic information obtained from respective BGP instances running on them. VGS 202 can be coupled to network 250, which can include a wireless overlay network 230 comprising a set of backhaul tunnels (e.g., GRE tunnels). A backhaul tunnel may couple a wireless access point (AP) to a gateway cluster 230. A respective AP can provide wireless access to a set of customer end devices, such as cell phones and portable computers. Gateway cluster 230 can include a cluster of gateways 222 and 224 that can couple external network 250 to fabric 210. VGS 202 can be coupled to gateways 222 and 224 via respective static tunnels. For example, a static tunnel 244 can couple gateway 224 to VGS 202 based on the virtual IP address of VGS 202. On the other hand, a backhaul tunnel 242 can couple gateway cluster 230 to AP 232. AP 232 can provide wireless access to end device 234. Data from end device 234 can be carried via tunnel 242 to gateway cluster 230.

A gateway switch, such as switch 212 or 214, can apply a set of forwarding rules, which are similar to the forwarding rules applicable to the inter-fabric tunnels, for the static tunnels. For example, a control packet received from dynamic tunnel 246 can be allowed to be forwarded to static tunnel 244. On the other hand, a control packet received from static tunnel 244 can be allowed to be forwarded to dynamic tunnel 246 (i.e., can be distributed within the fabric). Suppose that end devices 234 and 236 are the host and source, respectively, for a multicast group. Hence, end devices 234 and 236 can also be referred to as host 234 and source 236, respectively. To receive multicast data from source 236, host 234 can send a multicast control packet 262, which can be a multicast join request, to AP 232. AP 232 can then encapsulate packet 262 with a tunnel header and forward encapsulated packet 262 via tunnel 242.

One gateway in gateway cluster 230, such as gateway 224, can receive encapsulated packet 262, decapsulate the tunnel header, and obtain packet 262. Gateway 224 can then encapsulate packet 262 with a tunnel header and forward encapsulated packet 262 via tunnel 244. One of the participating switches of VGS 202, such as switch 214, can receive encapsulated packet 262, decapsulate the tunnel header, and obtain packet 262. Upon obtaining packet 262, switch 214 can determine that the ingress for packet 262 is a static tunnel. Switch 214 can check against the forwarding rules and determine that packet 262 is allowed to egress via a dynamic tunnel (e.g., an inter-fabric tunnel in fabric 210). Switch 214 can then identify a respective dynamic tunnel coupled to switch 214, encapsulate packet 262 with a corresponding tunnel header, and forward encapsulated packet 262 via a dynamic. Accordingly, switch 214 can then identify a respective intra-fabric tunnel coupled to VGS 202, such as tunnel 246.

Switch 214 can forward encapsulated packet 262 via dynamic tunnel 246 by suppressing the split-horizon rule for packet 262 based on the forwarding rules. Switch 214 can also share packet 262 with peer participating switch 212 via an ISL of VGS 202. When switch 218 receives encapsulated packet 262 via tunnel 246, switch 218 can decapsulate the tunnel header and forward packet 262 via local ports. Source 236 can receive packet 262 and determine the join request for the multicast group. Source 236 can then initiate transmission of the data stream of the multicast group to host 234 and send a multicast data packet 264 of the multicast group to switch 218. Packet 264 can then be forwarded via fabric 210 and network 250 to host 234. In this way, the forwarding rules ensure the propagation of control and data packets between hosts and sources even if they are separated by heterogeneous networks.

Figure 2B:
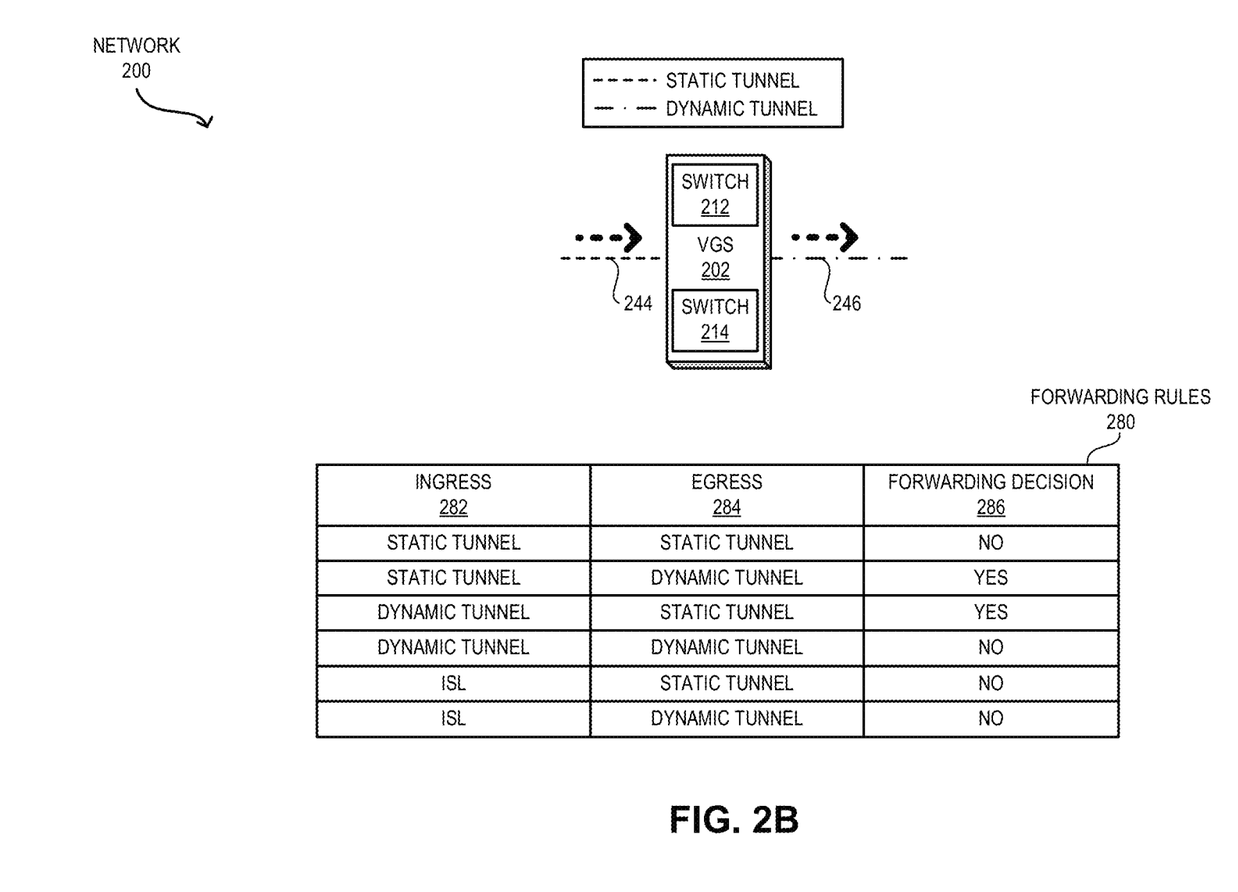
FIG. 2B illustrates an example of forwarding rules for forwarding multicast control packets in a heterogeneous network, in accordance with an aspect of the present application.

FIG. 2B illustrates an example of forwarding rules for forwarding multicast control packets in a heterogeneous network, in accordance with an aspect of the present application. A respective gateway switch in network 200, such as switch 214, can maintain a set of forwarding rules 280. A respective forwarding rule can provide a forwarding decision 286 indicating whether a control packet received from an ingress 282 is allowed to be forwarded to an egress 284. In other words, a respective forwarding rule can include a forwarding decision 286 for a combination of ingress 282 and egress 284. Here, forwarding decision 286 can indicate whether the packet is allowed to be forwarded for the combination of ingress 282 and egress 284. Forwarding rules 280 can be stored in conjunction with forwarding rules 180 of FIG. 1B.

In forwarding rules 280, if ingress 282 is a static tunnel and egress 284 is a dynamic tunnel (e.g., an inter-fabric tunnel), forwarding decision 286 can indicate that a packet is allowed to be forwarded (denoted with a "yes"). Similarly, if ingress 282 is a dynamic tunnel and egress 184 is a static tunnel, forwarding decision 286 can also indicate that a packet is allowed to be forwarded. For all other combinations of ingress 282 and egress 284, forwarding decision 286 can indicate that a packet is not allowed to be forwarded (denoted with a "no"). Accordingly, switch 214 can forward packet 262 via dynamic tunnel 246 when packet 162 is received from static tunnel 244. However, when switch 212 receives packet 162 via an ISL, switch 212 may not forward packet 162 via another tunnel.

Figure 3A:
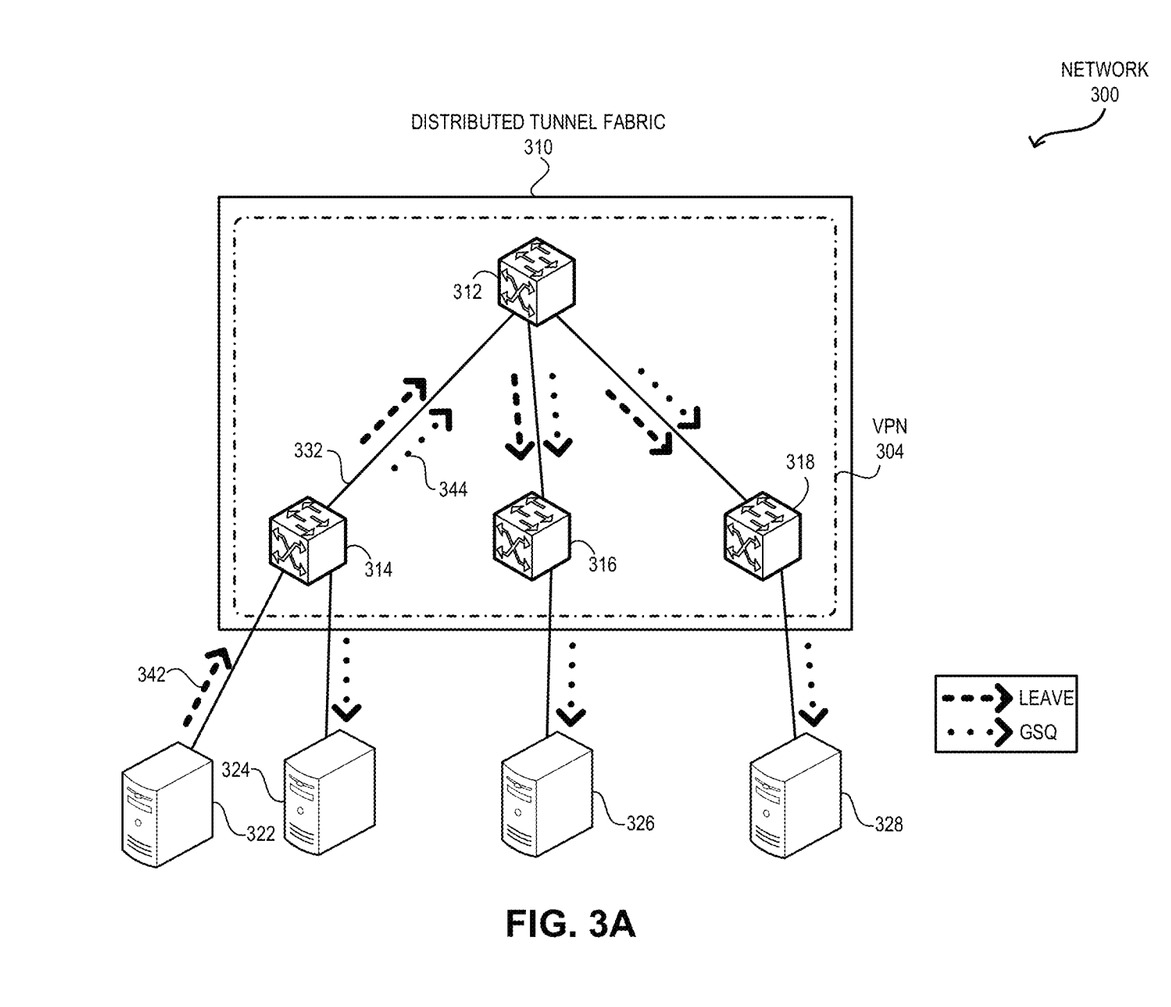
FIG. 3A illustrates an example of a distributed tunnel fabric supporting distributed multicast queriers at respective tunnel endpoints, in accordance with an aspect of the present application.

Furthermore, to conform to the standard deployment practice, a network may deploy a single multicast querier. FIG. 3A illustrates an example of a distributed tunnel fabric supporting distributed multicast queriers at respective tunnel endpoints, in accordance with an aspect of the present application. A network 300 can include a number of switches and devices, and may include heterogeneous network components, such as layer-2 and layer-3 hops, and tunnels. In some examples, network 300 can be an Ethernet, InfiniBand, or other networks, and may use a corresponding communication protocol, such as IP, FCOE, or other protocol. Network 300 can include a distributed tunnel fabric 310 that can include a number of switches 312, 314, 316, and 318. Switch 312 can be a standalone gateway switch or a VGS. A respective switch in fabric 310 can be associated with a MAC address and an IP address. A VPN 304, such as an EVPN, can be deployed over fabric 310. End devices 322 and 324 can be coupled to switch 314, end device 326 can be coupled to switch 316, and end device 328 can be coupled to switch 318.

Since a single endpoint in a fabric is typically elected as a querier, switch 312 can be elected as a querier for fabric 310. Hence, switch 312 can also be referred to as querier 312. Querier 312 can control the multicast functionalities in network 300. As a result, if querier 312 becomes unavailable (e.g., due to a failure or power cycle), querier functionalities can become unavailable in network 300, which can lead to multicast data traffic loss. When querier 312 becomes available after the event, the time taken to elect a new querier election may cause a network outage. The impact can be further exacerbated in a multi-fabric network (e.g., network 100 in FIG. 1A). Moreover, a failure in an underlay device of fabric 310 can cause an adverse impact on the propagation of queries.

In addition, if a link in the underlying network of fabric 310 becomes unavailable, other switches in fabric 310 may not have information associated with the multicast states. A switch, such as switch 314, impacted by the failure can lose multicast information. When switch 314 becomes available, switch 314 may re-learn the multicast information only upon receiving an AHQ from querier 312. While switch 314 waits for the AHQ, there can be a multicast traffic outage for end devices 322 and 324. Even if the link failure in the underlying network does not even trigger a change in the overlay topology of fabric 310, the query packets can be dropped due to the link failure. For example, even though the link failure may not change tunnel 332 between switches 312 and 314, the link failure may cause packet drops.

Furthermore, if end device 322 sends a leave packet 342 (e.g., an IGMP/MLD leave) for a multicast group, packet 342 would be sent to querier 312. Upon receiving leave 342, querier 312 can send a GSQ to all the devices in network 300 to determine whether any other multicast client is still interested or present for the same multicast flow. If there is no response received from any client, an entry associated with the multicast group can be removed from the forwarding hardware of switch 314. To remove the entry, switch 314 can wait for a predetermined period (e.g., based on an administratively configured robustness value) after receiving packet 342. However, if packet 342 is delayed while reaching querier 312 due to a delay in the underlying network, the GSQ may not be received by the other clients, such as end device 324. If the entry is removed before end device 324 can respond, there can be a loss of multicast traffic directed to end device 324.

To solve this problem, a respective switch operating as a tunnel endpoint, such as switches 312, 314, 316, and 318, can be configured as a querier for the local layer-2 ports. In this way, fabric 310 can support distributed queriers where a respective endpoint can operate as a local querier for the locally coupled end devices (e.g., local hosts). For example, switch 314 can operate as a querier for end devices 322 and 324. When switch 314 is configured as an endpoint in fabric 310, switch 314 can be elected as a querier by default. If switch 314 is not configured with an interface IP address, the local IP address used for configuring tunnel 332 can be used as a querier IP address. To ensure the localization of the queriers, switch 314 can be precluded from configuring a tunnel port coupling tunnel 332 for guiding multicast data paths in fabric 310. As a result, when switch 314 receives a leave message 342 from end device 322, switch 314 can distribute a GSQ 344 in the fabric to determine the existence of other members of the multicast group in network 300.

As described in conjunction with FIG. 1A, switch 314 can continue to share multicast control packets received from local layer-2 ports (e.g., from end devices 322 and 324) with other tunnel endpoints in fabric 310. Since a respective endpoint in fabric 310 can be configured as a querier for local devices, switch 314 does not need to operate as a querier for other endpoints. Hence, the multicast functionalities in network 300 can continue to operate even if switch 314 does not extend the querier operations to the tunnel ports (e.g., the port coupling tunnel 332). Since a respective endpoint in fabric 310 can operate as a querier, the unavailability of switch 314 can be limited to end devices 322 and 324 without impacting other segments of fabric 310. In this way, distributed queriers can avoid a single point of failure in fabric 310.

Moreover, when end device 322 sends packet 342, switch 314, which is the immediate endpoint, can receive packet 342. Since switch 314 is configured as the querier, switch 314 can perform the corresponding action, such as sending GSQ 344, even if there is a failure at another location in fabric 310. In particular, since packet 342 doesn't need to travel via a tunnel to reach a querier, the possibility of delay in the underlying network is reduced. Since the control packets from end devices 322 and 324 can be processed by switch 314, the flooding of control packets can be avoided in fabric 310. Since query packets can be sent frequently for facilitating efficient multicast, the reduction of flooding can lead to performance improvement of fabric 310.

Figure 3B:
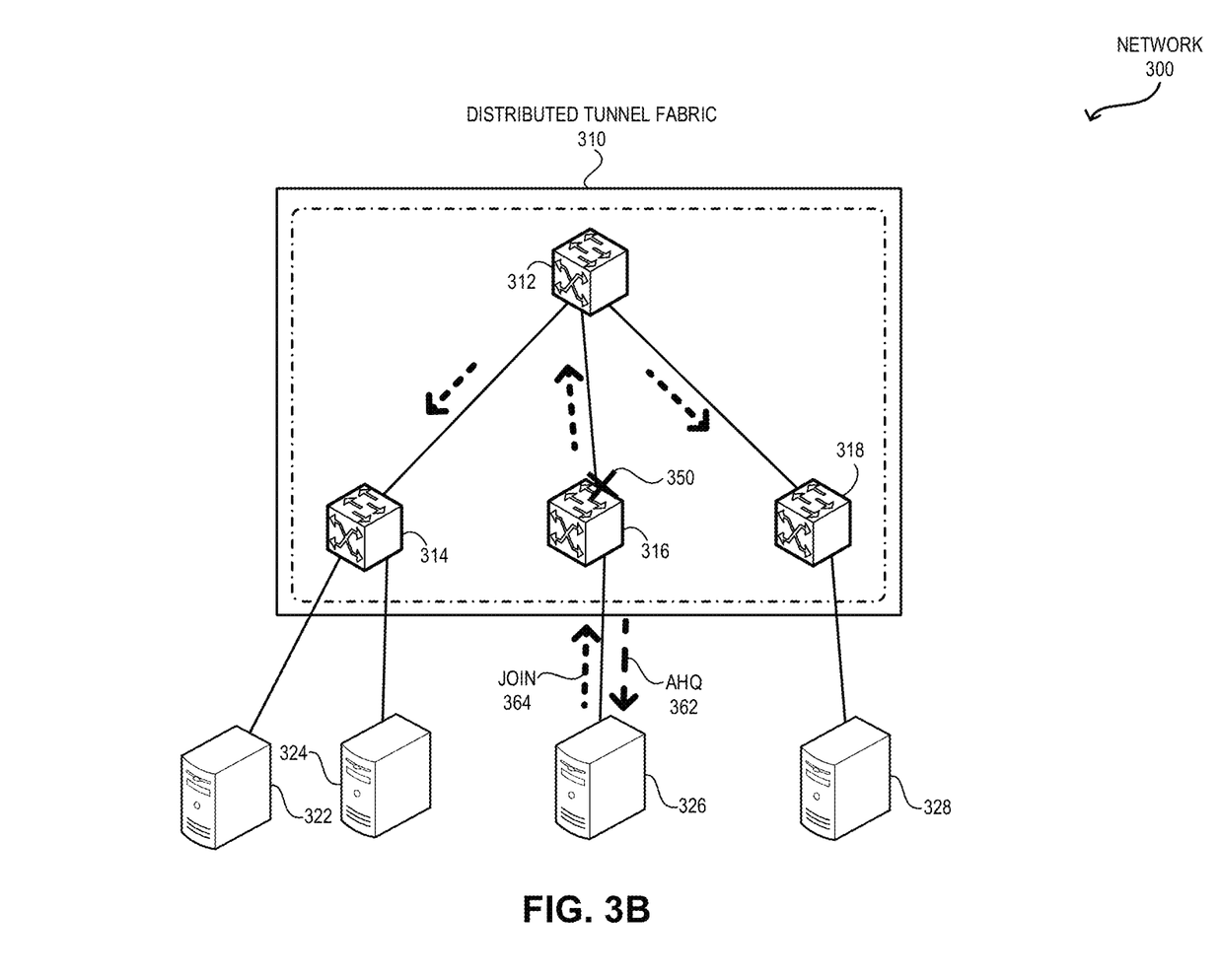
FIG. 3B illustrates an example of a multicast querier at a tunnel endpoint recovering from an event, in accordance with an aspect of the present application.

FIG. 3B illustrates an example of a multicast querier at a tunnel endpoint recovering from an event, in accordance with an aspect of the present application. Suppose that an event 350 (e.g., a node or link failure) causes switch 316 to be unavailable. Due to event 350, switch 316 may lose the locally stored multicast information (e.g., obtained from multicast joins). Upon recovery from event 350, switch 316 can send an AHQ 362 via the local ports to re-learn the multicast information instead of flooding fabric 310 with AHQ 362. Upon receiving AHQ 362, end device 326 can respond with a control packet 364, which can be a join request for a multicast group, to switch 316 if end device 326 has previously joined the multicast group and has not left. In this way, switch 316 can quickly learn the multicast groups associated with local end devices. Switch 316 can also forward packet 364 to other tunnel endpoints, such as switch 312, of fabric 310. In this way, the distributed queriers can facilitate quick convergence in fabric 310 without impacting the forwarding of multicast data paths in fabric 310.

Figure 4:
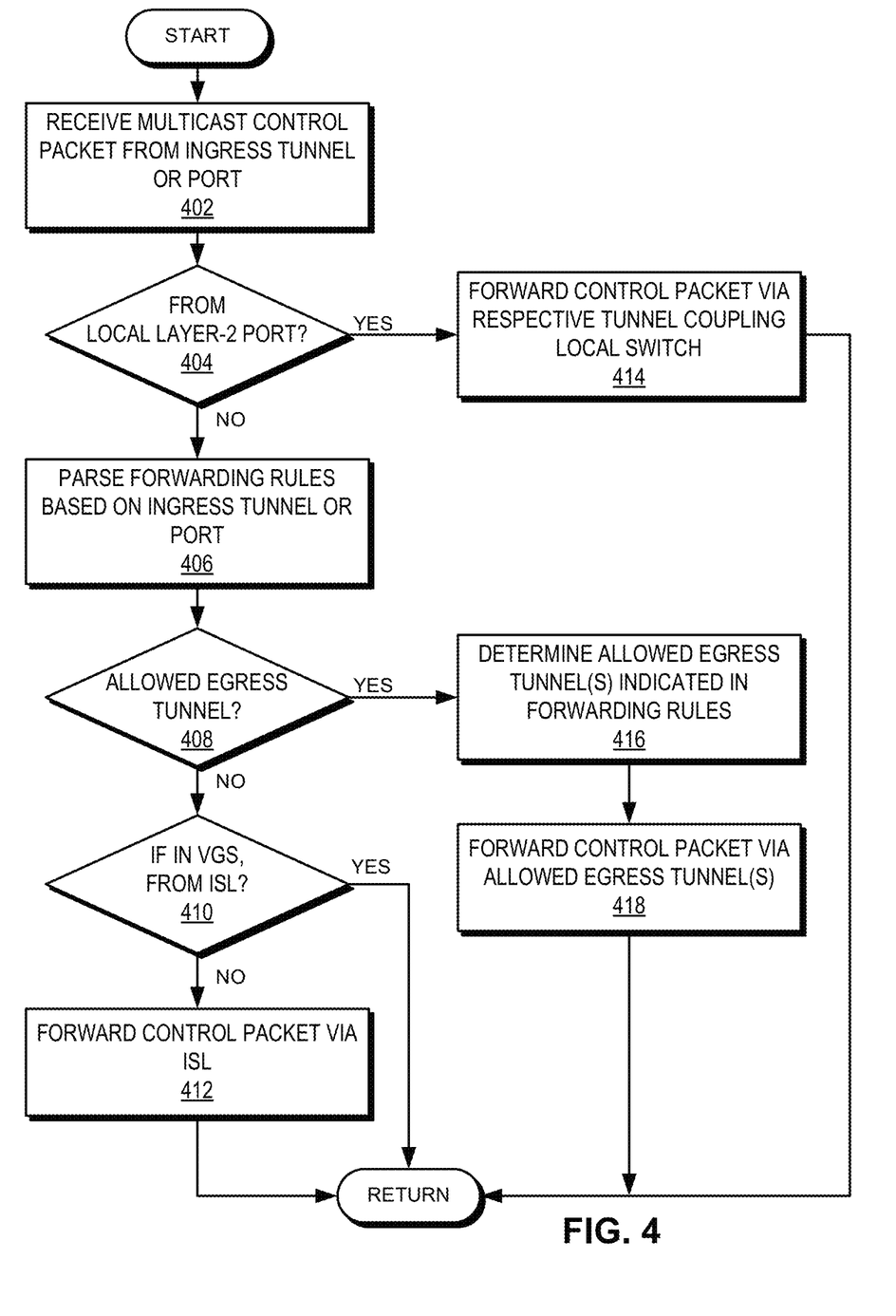
FIG. 4 presents a flowchart illustrating the process of a switch forwarding a multicast control packet in a multi-fabric network, in accordance with an aspect of the present application.

FIG. 4 presents a flowchart illustrating the process of a switch forwarding a multicast control packet in a multifabric network, in accordance with an aspect of the present application. During operation, the switch can receive a multicast control packet from an ingress tunnel or port (operation 402) and determine whether the control packet is received from a local layer-2 port (e.g., an Ethernet port) (operation 404). If the control packet is received from a local layer-2 port, the switch can forward the control packet via a respective tunnel coupling the local switch (operation 414). Here, the tunnel can be a tunnel in a fabric that includes the switch. On the other hand, if the control packet is not received from a local layer-2 port, the packet can be received from a tunnel or an ISL port. The switch can then parse the forwarding rules based on the ingress tunnel or port (operation 406).

The switch can then determine whether an allowed egress tunnel is identified in the forwarding rules (operation 408).

If an allowed egress tunnel is identified, the switch can determine the allowed egress tunnel(s) indicated in the forwarding rules (operation 416) and forward the control packet via the allowed egress tunnel(s) (operation 418). Forwarding the control packet via a tunnel can include encapsulating the control packet with a tunnel header, identifying a port configured for the tunnel, and transmitting the encapsulated packet via the port. On the other hand, if an allowed egress tunnel is not identified and the local switch is in a VGS, the switch can determine whether the packet is received from an ISL (operation 410). If the local switch is in a VGS and the packet is not received from an ISL, the switch can also forward the control packet via the ISL (operation 412).

Figure 5A:
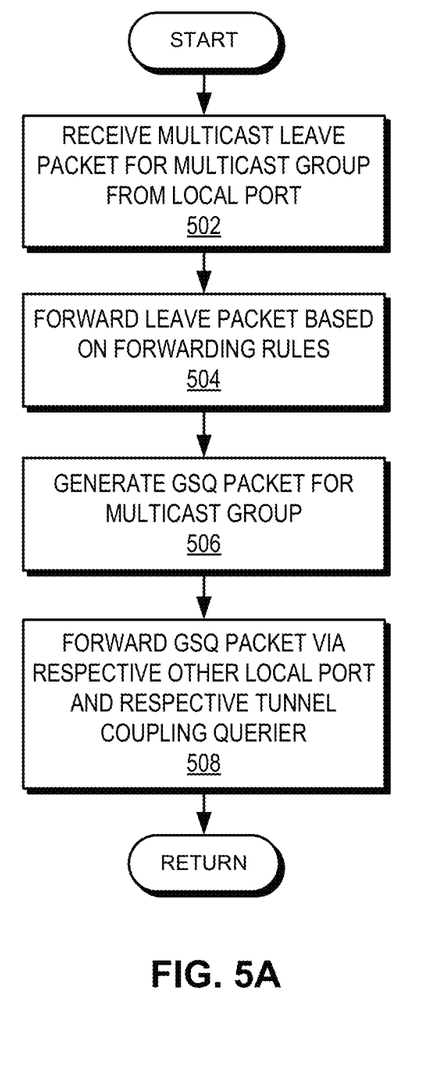
FIG. 5A presents a flowchart illustrating the process of a multicast querier at a tunnel endpoint processing a multicast leave request, in accordance with an aspect of the present application.

FIG. 5A presents a flowchart illustrating the process of a multicast querier at a tunnel endpoint processing a multicast leave request, in accordance with an aspect of the present application. During operation, the querier can receive a multicast leave packet for a multicast group from a local port (operation 502). The querier can then forward the leave packet based on the forwarding rules, as described in conjunction with FIGS. 1B and 2B (operation 504). Since the querier can facilitate multicast functionalities for the local layer-2 ports, the querier can generate a GSQ packet for the multicast group (operation 506). Subsequently, the switch can forward the GSQ packet via a respective other local port and a respective tunnel coupling the querier (operation 508). Here, the tunnel can be a tunnel in a fabric that includes the querier.

Figure 5B:
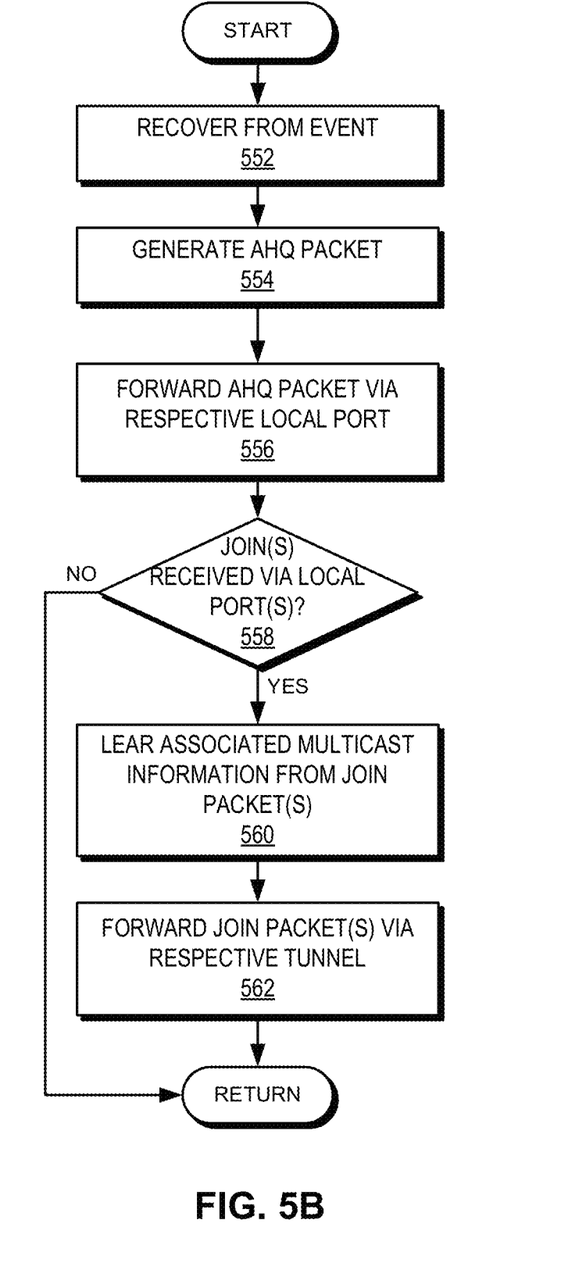
FIG. 5B presents a flowchart illustrating the process of a multicast querier at a tunnel endpoint recovering from an event, in accordance with an aspect of the present application.

FIG. 5B presents a flowchart illustrating the process of a multicast querier at a tunnel endpoint recovering from an event, in accordance with an aspect of the present application. During operation, the querier can recover from an event (operation 552) and generate an AHQ packet (operation 554). The querier can then forward an AHQ packet via a respective local port (operation 556) and determine whether join packet(s) are received via local port(s) (operation 558). If the querier is coupled to end devices that previously joined a multicast group and have not left, the querier can receive corresponding join packets. If join request(s) are received via local port(s), the querier can learn the associated multicast information from the join packet(s) (operation 560) and forward the join packet(s) via a respective tunnel (operation 562).

Figure 6:
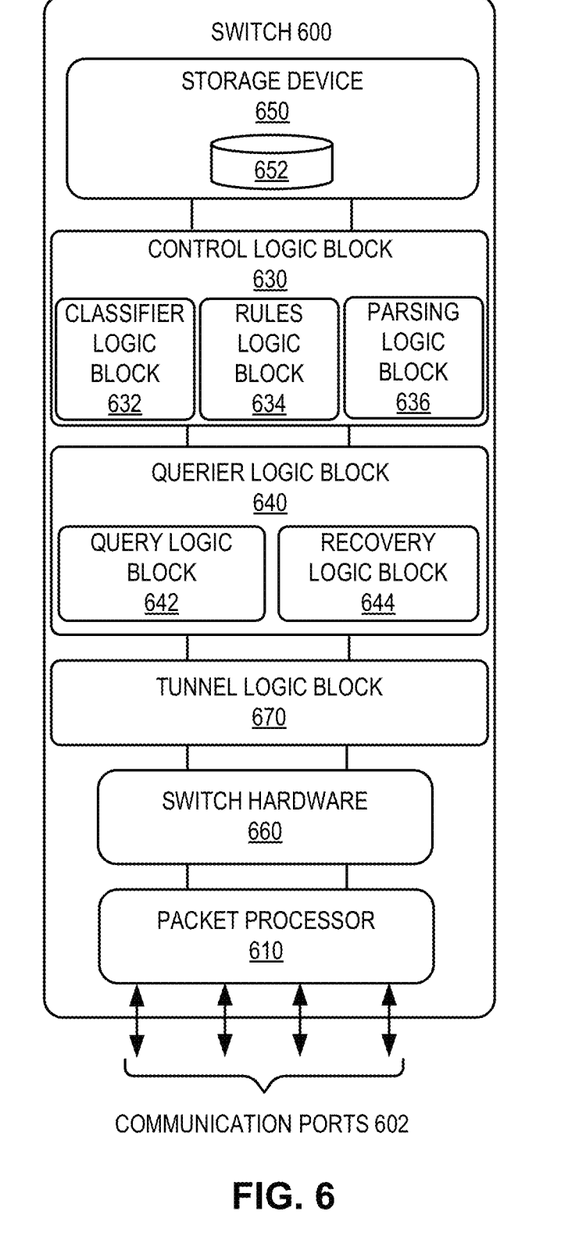
FIG. 6 illustrates an example of a switch supporting efficient multicast control packet forwarding and distributed multicast queriers in a distributed tunnel fabric, in accordance with an aspect of the present application.

FIG. 6 illustrates an example of a switch supporting efficient multicast control packet forwarding and distributed multicast queriers in a distributed tunnel fabric, in accordance with an aspect of the present application. In this example, a switch 600 can include a number of communication ports 602, a packet processor 610, and a storage device 650. Switch 600 can also include switch hardware 660 (e.g., processing hardware of switch 600, such as its application-specific integrated circuit (ASIC) chips), which includes information based on which switch 600 processes packets (e.g., determines output ports for packets). Packet processor 610 can extract and processes header information from the received packets. Packet processor 610 can identify a switch identifier (e.g., a MAC address and/or an IP address) associated with switch 600 in the header of a packet.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets. A respective port of communication ports 602 may operate as an ingress port and/or an egress port.

Switch 600 can maintain a database 652 (e.g., in storage device 650). Database 652 can be a relational database and may run on one or more Database Management System (DBMS) instances. Database 652 can store information associated with routing, configuration, and interface of switch 600. Switch 600 can include a tunnel logic block 670 that can establish a tunnel with a remote switch, thereby allowing switch 600 to operate as a tunnel endpoint. Switch 600 can include a control logic block 630 that can allow switch 600 to selectively apply split-horizon rules to multicast control packets.

Control logic block 630 can include a classifier logic block 632, a rules logic block 634, and a parsing logic block 636. Classifier logic block 632 can classify a respective tunnel originating at switch 600 to determine the type of the tunnel. Rules logic block 634 can maintain one or more sets of forwarding rules that can indicate whether to forward a multicast control packet via an egress tunnel or port based on the ingress tunnel or port. Parsing logic block 636 can parse the forwarding rules for a multicast control packet based on the ingress tunnel or port to determine to which egress tunnel or port the multicast control packet can be forwarded.

If switch 600 is configured as a querier (e.g., an IGMP/MLD querier), switch 600 can also include a querier logic block 640 that can operate switch 600 as the querier. Querier logic block 640 can include a query logic block 642 and a recovery logic block 644. Query logic block 642 can send a GSQ via a respective local port and tunnel if switch 600 receives a leave request via a local port. If switch 600 recovers from an event, recovery logic block 644 can send an AHQ via local layer-2 ports to avoid flooding the AHQ in the network.

One aspect of the present technology can provide a system for efficient multicast control packet forwarding at a first switch. During operation, the system can maintain a first tunnel between the first switch and a second switch in an overlay tunnel fabric that includes the first and second switches. The encapsulation of a packet sent via the overlay tunnel fabric is initiated and terminated within the overlay tunnel fabric. The system can also maintain a second tunnel between the first switch and a third switch, which can be in an external network that excludes the first and second switches. The switch can distinguish the first and second tunnels as intra-fabric and inter-fabric tunnels, respectively, of the overlay tunnel fabric. Upon receiving a multicast control packet via the first tunnel, the system can identify the second tunnel as the inter-fabric tunnel and forward the multicast control packet via the second tunnel. Here, a respective multicast control packet received from the first tunnel can be precluded from being forwarded on intra-fabric tunnels of the overlay tunnel fabric.

In a variation on this aspect, a first path associated with the first tunnel can be determined based on an internal Border Gateway Protocol (IBGP). On the other hand, a second path associated with the second tunnel can be determined based on an external BGP (eBGP).

In a variation on this aspect, upon receiving a second multicast control packet via the second tunnel, the system can identify the first tunnel as an intra-fabric tunnel and forward the second multicast control packet via the first tunnel. Here, a respective control packet received from the second tunnel can be precluded from being forwarded on inter-fabric tunnels coupled to the overlay tunnel fabric.

In a variation on this aspect, a respective tunnel endpoint in the overlay tunnel fabric can be configured as a multicast querier. The system can then generate an all-host query (AHQ) and forward the AHQ via a respective local layer-2 port of the first switch without forwarding the AHQ via a tunnel originating at the first switch.

In a further variation, the system can generate the AHQ in response to the first switch recovering from an unavailability event that causes a loss of multicast information at the first switch.

In a further variation, the system can receive a multicast join packet for a multicast group via a local layer-2 port as a response to the AHQ. The system can then forward the multicast join packet via a respective tunnel originating at the first switch.

In a variation on this aspect, a respective tunnel endpoint in the overlay tunnel fabric can be configured as a multicast querier. The system can then receive a leave packet for a multicast group and generate a group membership query (GSQ) for the multicast group. Subsequently, the system can forward the GSQ via a respective local layer-2 port of the first switch and a respective tunnel originating at the first switch.

In a variation on this aspect, the external network can include a second overlay tunnel fabric. Here, the encapsulation of a second packet sent via the second overlay tunnel fabric can be initiated and terminated within the second overlay tunnel fabric.

In a variation on this aspect, a respective intra-fabric tunnel can be a dynamic tunnel. On the other hand, a respective inter-fabric tunnel can be a static tunnel. The third switch can then operate as a gateway for the external network.

In a variation on this aspect, the system can maintain, at the first switch, a set of forwarding rules that can indicate whether a packet received from an ingress tunnel is allowed to be forwarded to an egress tunnel. Accordingly, the system can forward the multicast control packet via the second tunnel based on the set of forwarding rules.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware logic blocks or apparatus. These logic blocks or apparatus may include, but are not limited to, an application-specific integrated circuit (ASIC) chip, a field-programmable gate array (FPGA), a dedicated or shared processor that executes a particular software logic block or a piece of code at a particular time, and/or other programmable-logic devices now known or later developed. When the hardware logic blocks or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method comprising:
maintaining, by a first switch, a first tunnel with a second switch in an overlay tunnel fabric that includes the first and second switches, wherein encapsulation of a packet sent via the overlay tunnel fabric is initiated and terminated within the overlay tunnel fabric;
maintaining, by the first switch, a second tunnel with a third switch in an external network that excludes the first and second switches;
distinguishing the first and second tunnels as intra-fabric and inter-fabric tunnels, respectively, of the overlay tunnel fabric; and
in response to receiving a multicast control packet via the first tunnel:
identifying the second tunnel as the inter-fabric tunnel; and
forwarding the multicast control packet via the second tunnel, wherein a respective multicast control packet received from the first tunnel is precluded from being forwarded on intra-fabric tunnels of the overlay tunnel fabric.

2. The method of claim 1, wherein a first path associated with the first tunnel is determined based on an internal Border Gateway Protocol (IBGP), and wherein a second path associated with the second tunnel is determined based on an external BGP (eBGP).

3. The method of claim 1, wherein, in response to receiving a second multicast control packet via the second tunnel, the method further comprises:
identifying the first tunnel as an intra-fabric tunnel; and
forwarding the second multicast control packet via the first tunnel, wherein a respective control packet received from the second tunnel is precluded from being forwarded on inter-fabric tunnels coupled to the overlay tunnel fabric.

4. The method of claim 1, wherein a respective tunnel endpoint in the overlay tunnel fabric is configured as a multicast querier;
wherein the method further comprises:
generating an all-host query (AHQ); and
forwarding the AHQ via a respective local layer-2 port of the first switch without forwarding the AHQ via a tunnel originating at the first switch.

5. The method of claim 4, further comprising generating the AHQ in response to the first switch recovering from an unavailability event that causes a loss of multicast information at the first switch.

6. The method of claim 4, further comprising:
receiving a multicast join packet for a multicast group via a local layer-2 port as a response to the AHQ; and
forwarding the multicast join packet via a respective tunnel originating at the first switch.

7. The method of claim 1, wherein a respective tunnel endpoint in the overlay tunnel fabric is configured as a multicast querier;
wherein the method further comprises:
receiving a leave packet for a multicast group;
generating a group membership query (GSQ) for the multicast group; and
forwarding the GSQ via a respective local layer-2 port of the first switch and a respective tunnel originating at the first switch.

8. The method of claim 1, wherein the external network includes a second overlay tunnel fabric, and wherein encapsulation of a second packet sent via the second overlay tunnel fabric is initiated and terminated within the second overlay tunnel fabric.

9. The method of claim 1, wherein a respective intra-fabric tunnel is a dynamic tunnel, wherein a respective inter-fabric tunnel is a static tunnel, and wherein the third switch operates as a gateway for the external network.

10. The method of claim 1, further comprising:
maintaining, at the first switch, a set of forwarding rules that indicate whether a packet received from an ingress tunnel is allowed to be forwarded to an egress tunnel; and
forwarding the multicast control packet via the second tunnel based on the set of forwarding rules.

11. A non-transitory computer-readable storage medium storing instructions that when executed by a computer cause the computer to perform a method, the method comprising:
maintaining, by a first switch, a first tunnel with a second switch in an overlay tunnel fabric that includes the first and second switches, wherein encapsulation of a packet sent via the overlay tunnel fabric is initiated and terminated within the overlay tunnel fabric;
maintaining, by the first switch, a second tunnel with a third switch in an external network that excludes the first and second switches;
distinguishing the first and second tunnels as intra-fabric and inter-fabric tunnels, respectively, of the overlay tunnel fabric; and
in response to receiving a multicast control packet via the first tunnel:
identifying the second tunnel as the inter-fabric tunnel; and
forwarding the multicast control packet via the second tunnel, wherein a respective multicast control packet received from the first tunnel is precluded from being forwarded on intra-fabric tunnels of the overlay tunnel fabric.

12. The non-transitory computer-readable storage medium of claim 11, wherein a first path associated with the first tunnel is determined based on an internal Border Gateway Protocol (iBGP), and wherein a second path associated with the second tunnel is determined based on an external BGP (eBGP).

13. The non-transitory computer-readable storage medium of claim 11, wherein, in response to receiving a second multicast control packet via the second tunnel, the method further comprises:
identifying the first tunnel as an intra-fabric tunnel; and
forwarding the second multicast control packet via the first tunnel, wherein a respective control packet received from the second tunnel is precluded from being forwarded on inter-fabric tunnels coupled to the overlay tunnel fabric.

14. The non-transitory computer-readable storage medium of claim 11, wherein a respective tunnel endpoint in the overlay tunnel fabric is configured as a multicast querier;
wherein the method further comprises:

generating an all-host query (AHQ); and forwarding the AHQ via a respective local layer-2 port of the first switch without forwarding the AHQ via a tunnel originating at the first switch.

15. The non-transitory computer-readable storage medium of claim 14, wherein the method further comprises generating the AHQ in response to the first switch recovering from an unavailability event that causes a loss of multicast information at the first switch.

16. The non-transitory computer-readable storage medium of claim 11, wherein a respective tunnel endpoint in the overlay tunnel fabric is configured as a multicast querier; wherein the method further comprises:

receiving a leave packet for a multicast group;

generating a group membership query (GSQ) for the multicast group; and forwarding the GSQ via a respective local layer-2 port of the first switch and a respective tunnel originating at the first switch.

17. The non-transitory computer-readable storage medium of claim 11, wherein the external network includes a second overlay tunnel fabric, and wherein encapsulation of a second packet sent via the second overlay tunnel fabric is initiated and terminated within the second overlay tunnel fabric.

18. The non-transitory computer-readable storage medium of claim 11, wherein a respective intra-fabric tunnel is a dynamic tunnel, wherein a respective inter-fabric tunnel is a static tunnel, and wherein the third switch operates as a gateway for the external network.

19. The non-transitory computer-readable storage medium of claim 11, wherein the method further comprises:

maintaining, at the first switch, a set of forwarding rules that indicate whether a packet received from an ingress tunnel is allowed to be forwarded to an egress tunnel; and forwarding the multicast control packet via the second tunnel based on the set of forwarding rules.

20. A computer system, comprising:

a processor;

a memory device;

a tunnel logic block to:

maintain a first tunnel with a second computer system in an overlay tunnel fabric that includes the computer system and the second computer system, wherein encapsulation of a packet sent via the overlay tunnel fabric is initiated and terminated within the overlay tunnel fabric; and maintain a second tunnel with a third computer system in an external network that excludes the computer system and the second computer system;

a classifier logic block to distinguish the first and second tunnels as intra-fabric and inter-fabric tunnels, respectively, of the overlay tunnel fabric;

a forwarding logic block to receive a multicast control packet via the first tunnel; and a control logic block to:

identify the second tunnel as the inter-fabric tunnel; and forward the multicast control packet via the second tunnel using the forwarding logic block, wherein a respective multicast control packet received from the first tunnel is precluded from being forwarded on intra-fabric tunnels of the overlay tunnel fabric.

\* \* \* \* \*